June 5, 1945.   R. L. EDGAR   2,377,768
CAR TRUCK
Filed Oct. 5, 1944   9 Sheets-Sheet 1

Fig. 1.

Inventor
ROBERT L. EDGAR
By Clarence B. DesJardins
His Attorney

June 5, 1945.  R. L. EDGAR  2,377,768
CAR TRUCK
Filed Oct. 5, 1944  9 Sheets-Sheet 3

Inventor
ROBERT L. EDGAR
By Clarence B. Desjardins
His Attorney

June 5, 1945. R. L. EDGAR 2,377,768
CAR TRUCK
Filed Oct. 5, 1944 9 Sheets-Sheet 6

Fig. 16.

Inventor
ROBERT L. EDGAR

June 5, 1945. R. L. EDGAR 2,377,768
CAR TRUCK
Filed Oct. 5, 1944 9 Sheets-Sheet 8

Inventor
ROBERT L. EDGAR
By Clarence B. Desjardins
His Attorney

June 5, 1945.　　　　R. L. EDGAR　　　　2,377,768
CAR TRUCK
Filed Oct. 5, 1944　　　9 Sheets-Sheet 9

Inventor
ROBERT L. EDGAR
By Clarence B. Desjardins
His Attorney

Patented June 5, 1945

2,377,768

UNITED STATES PATENT OFFICE 2,377,768

CAR TRUCK

Robert L. Edgar, Barnesville, Ohio, assignor to The Watt Car & Wheel Company, Barnesville, Ohio, a corporation of Ohio Application October 5, 1944, Serial No. 557,259

14 Claims. (Cl. 105—179)

My invention relates to improvements in car trucks and has to do, more particularly, with the construction and mounting of wheel-carrying trucks for a mine car. This application is a continuation-in-part of my pending application for Car trucks, Serial No. 525,679, filed March 9, 1944.

The principal object of my invention is to provide an improved car truck construction for an eight-wheel car, which will be simple and economical to manufacture, and sturdy and durable in use.

A further object of my invention is to provide a mounting for the wheels of an eight-wheel car, in which the car will be resiliently supported from truck frames that swivel about vertical axes, and can also rock about horizontal axes as required by inequalities in the tracks.

Another object of my invention is to provide a wheeled truck assembly, which can be readily taken apart for repair or replacement of parts, but which will not be accidentally disassembled, in case the car should be derailed or overturned.

Further objects, and objects relating to details of construction and economies of operation, will definitely appear from the detailed description to follow. My invention is clearly defined and pointed out in the appended claims. Structures, constituting preferred embodiments of my invention, are illustrated in the accompaning drawings, forming a part of this specification, in which

In the drawings, the same reference numerals refer to the same parts throughout the several views, and the sectional views are taken looking in the direction of the arrows at the ends of the section lines.

In general, the car truck assembly of my invention, of which there will be four, in the case of an eight-wheel car, located under the four corners of the car, comprises a truck frame, in which the car wheels are mounted fore and aft, a horizontal truck hinge bolt carried centrally by the truck frame, a spring saddle pivotally mounted upon said hinge bolt and held against lateral movement with respect to the truck frame, a member revolubly mounted so as to swivel about a vertical axis, said member having depending flanges slidably engageable with the truck frame to prevent relative lateral movement between them, and said hinge bolt passing through said flanges so as to prevent relative fore and aft movement, and springs interposed between the member and the spring saddle. This member, which swivels about a vertical axis, may be a lower center bearing member, which cooperates with an upper center bearing member secured to the car bottom. The spring saddle may consist of a member having its central portion arched over the truck hinge bolt, and having a retaining member secured thereto and passing beneath the bolt. The flanges depending from said lower center bearing member may have notches therein, which receive the truck hinge bolt, and these notches may be closed by pins or bolts secured to the flanges and spanning the lower ends of the notches, to prevent the truck frame from falling away, in case the car should be overturned or derailed.

Figure 1:
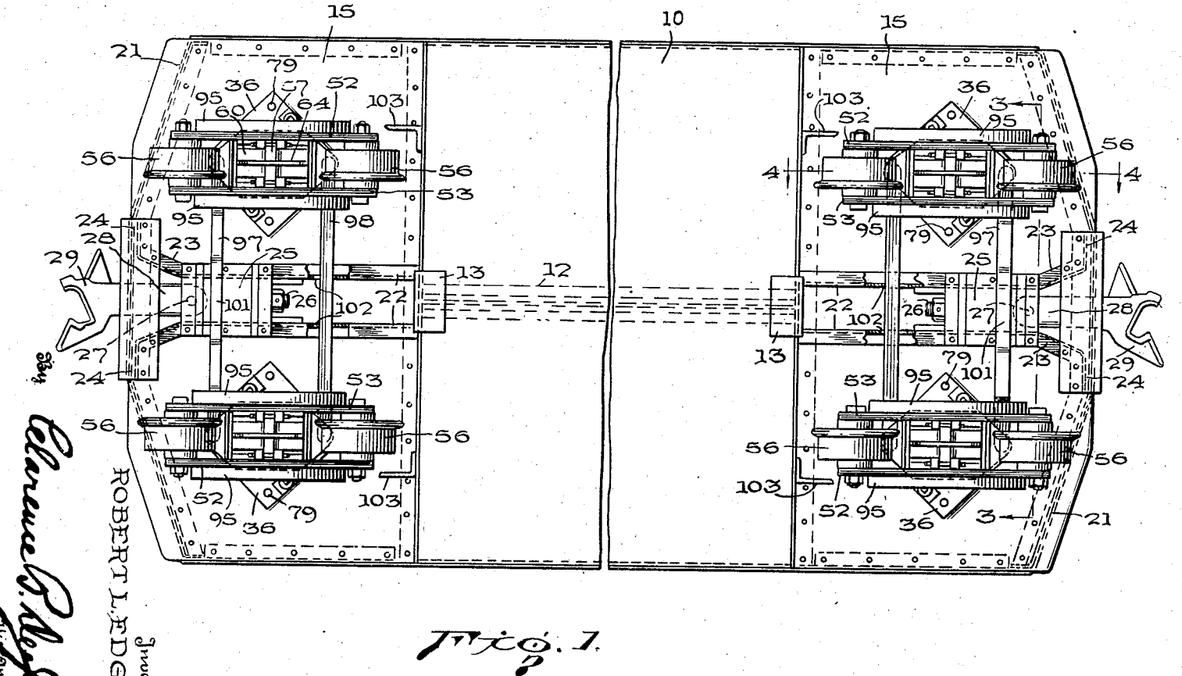
Fig. 1 is a bottom plan view of a mine car embodying my invention.
Figure 2:
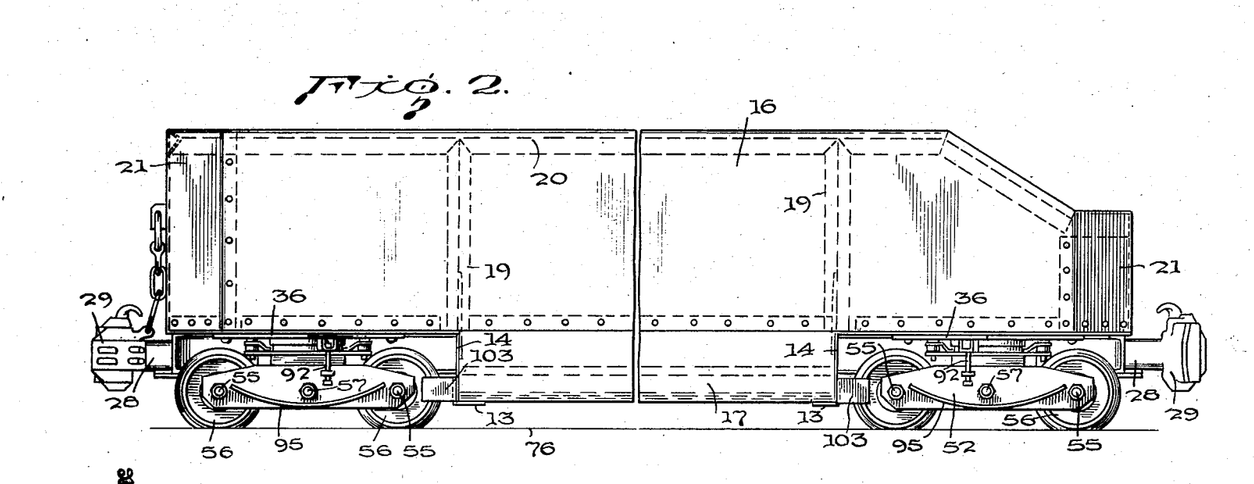
Fig. 2 is a view of the car in side elevation.

Referring to the numbered parts of the drawings, and more particularly to Figs. 1 to 15, inclusive, I have shown one form of my invention embodied in an eight-wheel car illustrated in Figs. 1 and 2. This car comprises a central lading bottom 10, which has a stiffening member 12 secured to the top surface thereof, along the longitudinal centerline thereof. Angles 13 are secured to the bottom sheet, adjacent the ends of the number 12, and have upwardly extending legs. Riser plates 14 are secured to the angles 13, and to the front and rear edges of the bottom sheets 10, and extend upwardly where they are secured to the end lading bottoms 15, which, as shown, lie in a horizontal plane considerably above that of the central bottom 10. The car structure includes the side plates 16, extending from one end of the car to the other, and the plates 17 secured to the lower central portions of plates 16 and to the edges of the bottom plate 10. Plates 16 are stiffened by the ribs 19 and the longitudinally extending belt rails 20. The car body is completed by the end members 21, formed as shown in Fig. 1.

Figure 14:
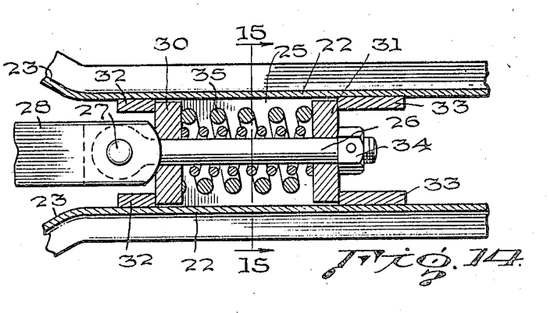
Fig. 14 is a fragmentary, sectional view of the buffer and draft gear.
Figure 15:
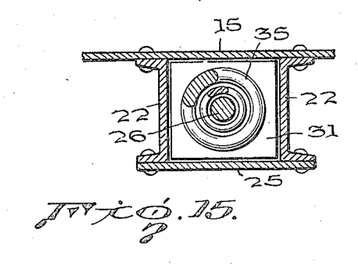
Fig. 15 is a vertical, sectional view, taken on the line 15—15 of Fig. 14.

A buffer and draft gear is mounted at each end of the car, in line with the stiffening member 12. Each buffer and draft gear comprises a pair of spaced draft members 22, the upper flanges of which are secured to the end lading bottom 15. Said draft members are flared outwardly at 23, and the outer ends are turned laterally at 24, and secured to the end structure of the car. A plate 25 is secured to the bottom flanges of said angles. A bolt 26 is pivotally connected, at 27, to the shank 28 of a coupler head 29. This bolt 26 extends through followers 30 and 31, which are slidably mounted on the plate 25 between the members 22. Stops 32 are secured to the inner faces of the members 22 and limit the movement of follower 30, in one direction, while stops 33 secured to the inner faces of said members limit the movement of the follower 31, in the other direction. A nut 34, screwed on the threaded end of the bolt 26, engages the follower 31, and a spring 35, which may be of double construction as shown, as interposed between the followers 30 and 31. When this buffer and draft gear is under buffing force, the end of shank 28 engages follower 30 and moves it toward follower 31, against the pressure of spring 35, follower 31 being held against movement by stops 33. When the gear is under draft strain, nut 34 engaging follower 31 moves it toward follower 30 against the pressure of spring 35, follower 30 being held against movement by stops 32. It is to be noted that the buffing and draft strains are transmitted to draft members 22, which are secured to the end lading bottom adjacent the portion of the car structure that is stiffened by the longitudinal stiffener 12.

The car is supported by four truck assemblies symmetrically arranged beneath the four corners of the car. Since each of these truck assemblies is the same, but one will be described. A plate 36 is secured to the lower surface of the end lading bottom 15, as by the rivets 79. This plate has a central opening 77 therein, and a downwardly extending flange 78 surrounding said opening. As shown, this flange may be made separate from the plate 36 and integrally secured thereto, as by welding. The plate 36, together with the flange 78, constitutes an upper center bearing member, which is fixed to the bottom 15 of the car. Revolubly mounted upon this upper center bearing member, so as to swivel about a vertical axis, is a lower center bearing member 80, which has an upwardly extending flange 81 of such dimensions as to fit within the flange 78 and the opening 77 of the upper center bearing member. As shown, the flange 81 may be made separately from the lower center bearing member 80, and integrally secured thereto, as by welding. Flange 81 forms a cup or chamber upon the upper surface of the lower center bearing member, which is intended to be filled with grease for the lubrication of the bearing, and flange 81 is provided with holes 82 therethrough, near the upper surface of the lower center bearing member 80, so that grease may have access to the bearing surfaces to lubricate the same.

An annular flange 83 is welded to the top surface of lower center bearing member 80, and spaced slightly from the outside of the upper center bearing flange 78. Another annular flange 84 is welded to the lower surface of plate 36 and depends therefrom, outside of the upper portion of flange 83, being spaced slightly therefrom. These two flanges, 83 and 84, serve as a means for retaining the lubricating grease in the cup or chamber formed by the flange 81, when the car is turned upside down in the rotary dump, and they also serve as a means for preventing dirt from getting access to the bearing surfaces.

It will be seen that the lower center bearing member 80 is permitted to swivel about a vertical axis, but the broad bearing surfaces provided by flanges 78 and 81 prevent any substantial tilting of the lower center bearing with respect to the upper. The lower center bearing member 80 has secured thereto, as by welding, and depending therefrom arranged fore and aft, a pair of sleeves 49, which project downwardly therefrom and form spring guides. It also has a pair of depending side flanges 50, each of which has a notch 51 formed therein, the lower end of which is open. These depending flanges 50 are thickened and stiffened by members 85, which are welded thereto and have notches 86 identical in form with the notches 51.

The truck frame comprises a pair of side members 52 and 53, which are rigidly connected by the cross members 54 to form a rigid truck frame. Axles 55 are mounted fore and aft therein and the car wheels 56 are journaled on said axles between the side members of said frame. A truck hinge bolt 57 extends horizontally through the side members of the truck frame centrally thereof, and has a head 58 engaging the outside of side member 53 and a nut 59 screwed on the other end thereof and engaging the outside of truck frame side member 52. The side members 52 and 53 are so spaced that the flanges 50 of the lower center bearing member 80 are slidably engaged therewith, to prevent lateral movement of the truck frame with respect to said lower center bearing member. The truck hinge bolt 57 is located in the notches 51 and 88 of said flanges 50 and stiffening members 85, and thereby displacement of the truck frame, fore and aft with respect to the lower center bearing member 80, is prevented.

A spring saddle 60 has a central portion 61, which is arched over the truck hinge bolt 57. This saddle is mounted on the truck hinge bolt, between the inner faces of the stiffening members 85 that are welded to the inner faces of flanges 50, and is in engagement therewith and forms a spacer between these two flanges, stiffening the entire structure. The flanges 50 are thus in slidable engagement with the edges of saddle 60, and the side members 52 and 53 of the truck frame. Sleeves 62 are secured to the upper face of saddle 60, fore and aft thereof, and project upwardly forming spring guides for the lower ends of springs 63, which are interposed between saddle 60 and the lower center bearing member 80, being guided by the sleeves 62 and 49 at the lower and upper ends thereof, respectively. A bar 64 is welded or otherwise secured to the lower surface of the saddle 60 and passes beneath the truck hinge bolt 57, thus maintaining the saddle in pivotal relation with said bolt.

Each of the side flanges 50 has downwardly projecting portions 65, at the sides of the notches 51, and there are passages 66 extending transversely of said portions, through which a pin 87 is passed. One end of this pin is bent at right angles, as at 88 (Fig. 8), and, after the pin has been inserted, the other end is bent laterally, as at 89, so as to hold the pin in position. This pin spans the lower end of the notch 51 and closes it. It prevents the truck hinge bolt 57, and the truck frame, from dropping completely away from the lower center bearing member, in case the car should be derailed or overturned.

Figures 4, 5, 8, 9:
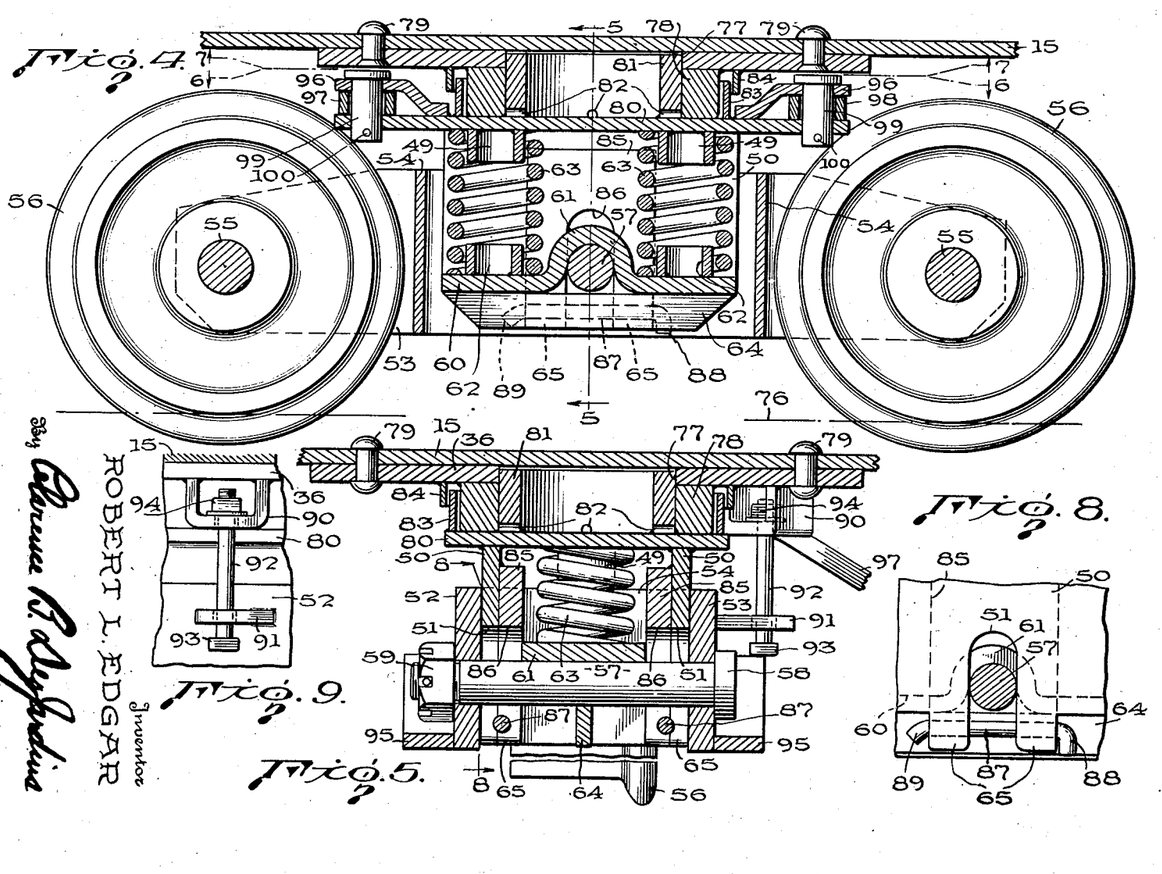
Fig. 4 is a vertical, sectional view, taken on the line 4—4 of Fig. 1.
Fig. 5 is a vertical, sectional view, taken on the line 5—5 of Fig. 4.
Fig. 8 is a detail, sectional view, taken on the line 8—8 of Fig. 5.
Fig. 9 is a detail view, in side elevation, of certain parts shown in Figs. 2 and 3.
Figure 6:
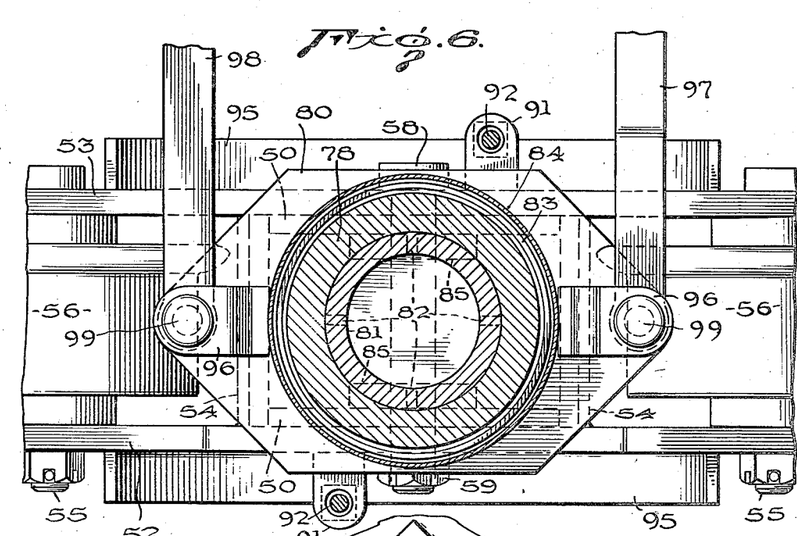
Fig. 6 is a horizontal, sectional view, taken on the line 6—6 of Fig. 4.
Figure 7:
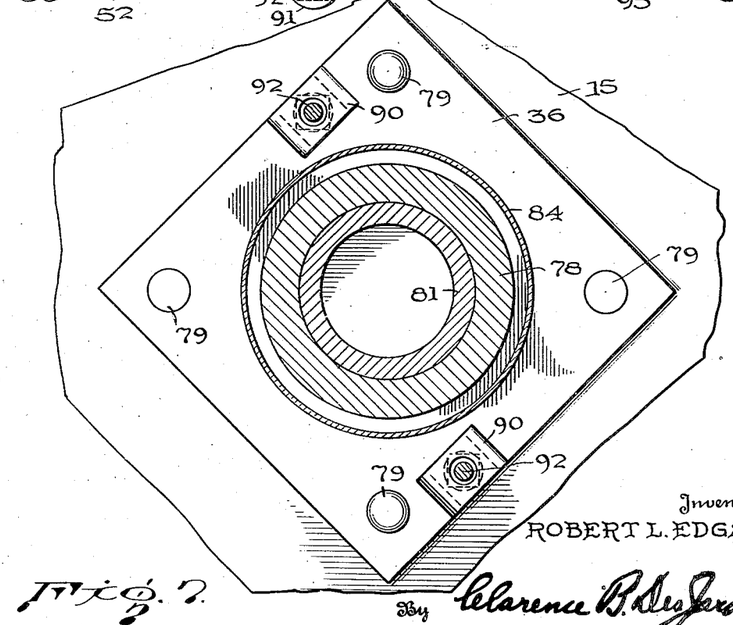
Fig. 7 is a horizontal, sectional view, taken on the line 7—7 of Fig. 4.
Figures 10, 12:
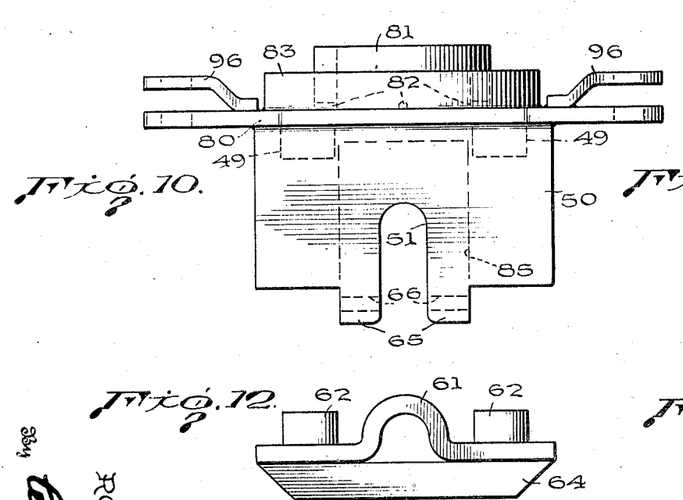
Fig. 10 is a view, in side elevation, of the lower center bearing member.
Fig. 12 is a view, in side elevation, of the spring saddle.
Figure 11:
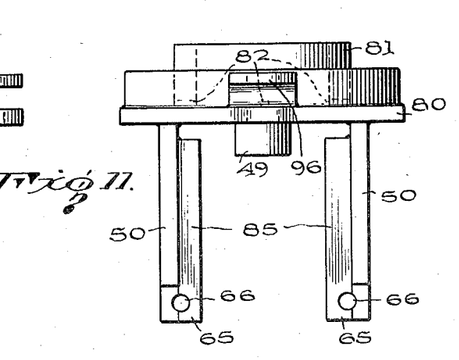
Fig. 11 is a view of said member, in end elevation.
Figure 13:
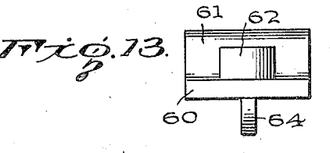
Fig. 13 is a view of the saddle in end elevation.

When the car is in normal use, with the wheels 56 resting on the rails indicated at 76 in Figs. 2 and 4, the car body will rest upon and be supported by the lower center bearing members 80, which, in turn, are resiliently supported from the truck frames by the springs 63. Under these conditions, the weight of the car and its lading will hold the upper and lower center bearing members against separation, but it is desirable to provide means for preventing the entire separation of the lower center bearing member from the upper center bearing member, in case the car should be derailed or overturned. To this end, I have provided, on each of the upper center bearing members, U-shaped brackets 90 welded to the plate 36 and located thereon, as shown in Fig. 7. I have also provided, on each of the truck frame side members 52 and 53, brackets 91 projecting laterally from the outer sides thereof and so located as to be in line with the brackets 90. A bolt 92, having a head 93, is passed through openings in the bracket 91 and the corresponding base of the U-shaped bracket 90, and held in place by a nut 94 screwed on the upper end of the bolt and engaging the upper surface of the base of bracket 90. These bolts 92, engaging brackets 90 and 91, thus limit the vertical movement of the lower center bearing member with respect to the upper center bearing member, so that the lower member cannot drop away completely from the upper member, in case the car should be derailed or overturned. Upon the outer side of each of the truck frame side members 52 and 53, there is welded a laterally extending strip 95, which is bent into the curved or arcuate shape shown in Fig. 2. These pieces are added to aid miners in getting the car on the tracks after it has been derailed.

Figure 3:
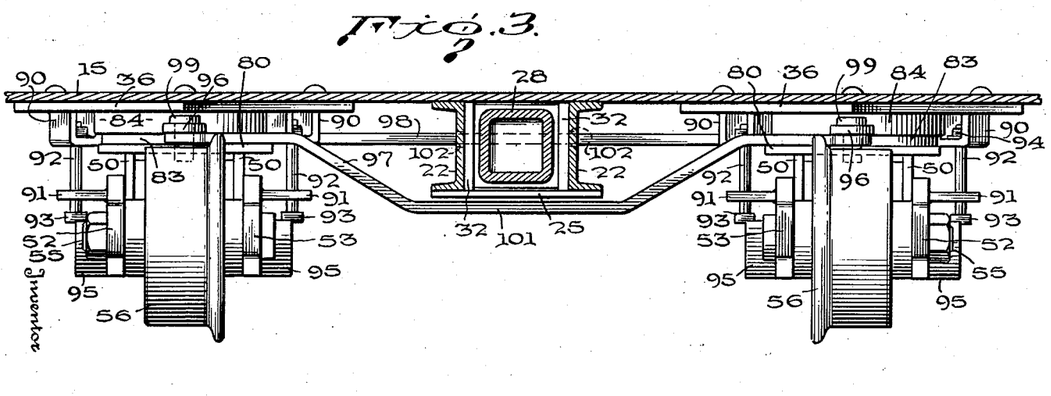
Fig. 3 is a vertical, sectional view, taken on the line 3—3 of Fig 1.

As shown in Fig. 1, the swiveling truck frames, at the same end of the car, are interconnected by means of tie bars to maintain, in general, their parallelism, while permitting such slight tipping of the truck frames from the vertical as may be required in rounding curves or by inequalities of the track. A pair of brackets 96 are secured to the upper surface of each lower center bearing member 80, at diametrically opposite points thereof, the body portion of each bracket being spaced from the upper surface of the bearing member 80 and the brackets being integrally secured thereto, as by welding. One of these brackets is arranged fore, and the other aft, of the vertical axis about which the lower center bearing member swivels, and the corresponding brackets, on the lower center bearing members at the same end of the car, are connected by tie bars 97 and 98, respectively. The ends of the tie bars 97 and 98 extend between the upper face of the lower center bearing member 80 and the body portion of the bracket 96, and are pivotally connected thereto by a headed pin 99, extending through openings in the bracket 96, the end of the tie bar, and the lower center bearing member, and being held in place by a cotter pin 100. As shown in Fig. 3, the tie bar 97, which is nearest the end of the car, is bent downwardly at 101 and extends beneath the draft members 22, while the tie bar 98, which is remote from the end of the car, extends through suitable openings 102 provided in the draft members 22, as indicated in Fig. 1. The axes of the pivotal connections between the tie bars and the lower center bearing member lie in a vertical plane, which includes the axis about which the lower center bearing member swivels and the mid-points of the tread surfaces of the corresponding wheels 56. Angle brackets 103 may be provided, to limit the swiveling movements of the truck frames.

The car wheels 56, of course, run upon the track rails that are indicated at 76, in Figs. 2 and 4. These support the truck frames and the latter, in turn, support the truck hinge bolts 57, upon which the spring saddles 60 are pivotally mounted. Each lower center bearing member 80, having its flanges 50 engaging the inner sides of the side members 52 and 53 of the truck frame, and the inner sides of said flanges engaging the edges of the spring saddle 60, lateral movement of said bearing member with respect to the truck frame is prevented. Since the truck hinge bolt 57 engages in the slots 51 of said flanges, movement of the lower bearing member 80, fore and aft with respect to the truck frame, is also prevented, and said bearing members and, therefore, the car bottom are resiliently supported from the spring saddles and the truck frames by means of the spring 63, while said lower bearing members and the truck frames are permitted to swivel about vertical axes.

In Figs. 16 to 26, inclusive, I have shown a modified form of my invention embodied in a mine car of the eight-wheel type, substantially the same as that illustrated in Figs. 1 and 2. This modified form is disclosed in my application for U. S. Letters Patent, Serial No. 525,679, of which the present application is a continuation-in-part. Reference will be made only to those parts of the structure, which differ from that illustrated in Figs. 1 to 15, inclusive. As in the preferred form of my invention, the car is supported by four truck assemblies symmetrically arranged beneath the four corners of the car. Each of these truck assemblies includes a plate 36, that is secured to the lower surface of the end lading bottom 15. This plate has a hole 38 therein, which receives the head 39 of a king pin 40 that depends vertically therefrom. This king pin extends through a central opening in an upper center bearing member 41, which is attached to the car bottom and plate 36 by means of rivets 42, and which is coaxial with the king pin and engages the lower surface of the head 39. This upper center bearing member has an annular, downwardly projecting flange 43. Revolubly mounted on the king pin 40 is a lower center bearing member 44, which has an annular flange 46 surrounding the central opening, through which the king pin passes, and a spaced annular flange 47. The annular groove, formed by these flanges 46 and 47, receives the annular flange 43 on the upper center bearing member 41. The lower member 44 may be stiffened by suitable ribs 45. A nut 48, screwed on the threaded lower end of the king pin 40, engages the lower surface of the lower center bearing member 44 and holds it from vertical displacement with respect to the upper bearing member and the car bottom, while permitting it to swivel about a vertical axis. Member 44 has secured thereto, fore and aft, a pair of sleeves 49, which project downwardly therefrom and form spring guides. The lower center bearing member 44 also has a pair of depending side flanges 50, each of which has a notch 51 formed therein, the lower end of which is open.

Each truck assembly includes a truck formed of the truck frame side members 52 and 53, and the cross members 54, in which the wheels 56 are journaled, fore and aft, on the axles 55, as in the preferred form of my invention. Each truck frame carries a horizontally-extending truck hinge bolt 57, on which the spring saddle 60 is pivotally mounted, being retained thereon by the member 64, welded to the lower surface of the spring saddle and extending beneath the truck hinge bolt, as has already been described in connection with the preferred form of my invention. Springs 63 are interposed between the lower center bearing member 44 and the spring saddle 60, being supported and guided by sleeves 49 and 62, as has already been described. In this form of my invention, the lower end of each notch 51 is closed by a bolt 67, extending through openings 66 in the downwardly projecting portions 65 of the side flange 50, and passing beneath the truck hinge bolt. These bolts 67 prevent the truck frame from dropping entirely away from the lower center bearing member, when the car is derailed, and, because of the nut 48 on the lower end of the king pin 57, which prevents separation of the lower center bearing member 44 from the upper center bearing member 41, the truck frame cannot fall away from the upper center bearing member. Because of this, it is unnecessary to provide brackets 90 and 91, and bolts 92, for the purpose of preventing separation of the truck frame from the upper center bearing member, as in the preferred form of my invention.

Figure 16:
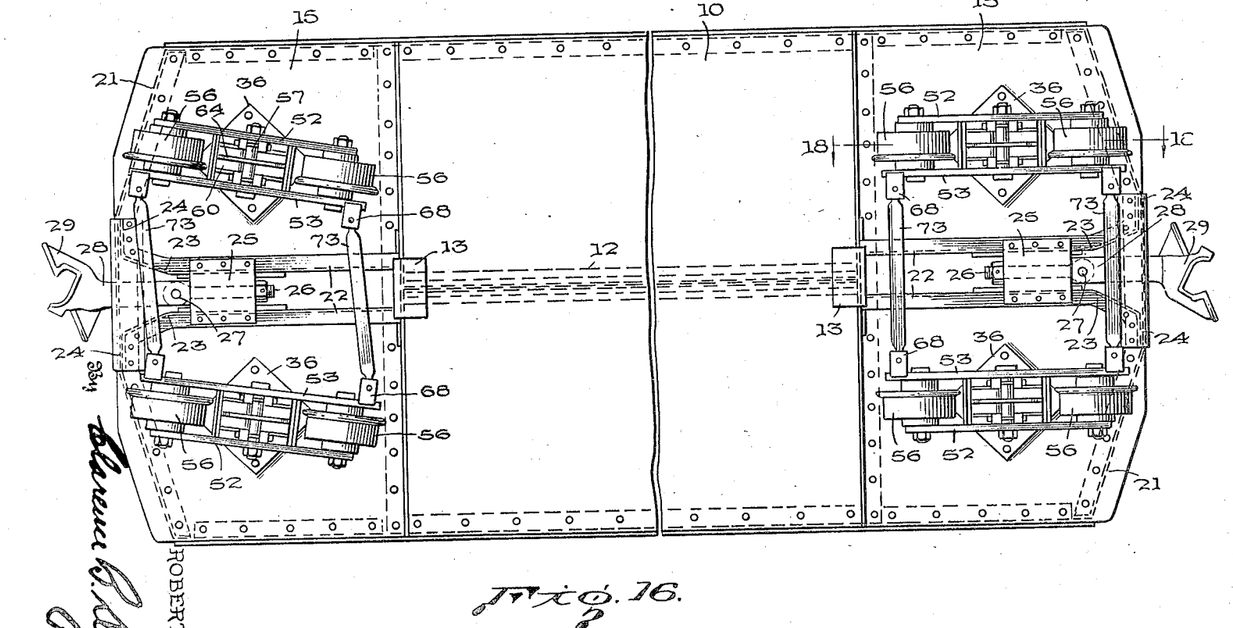
Fig. 16 is a bottom plan view of a mine car embodying a modified form of my invention.
Figure 17:
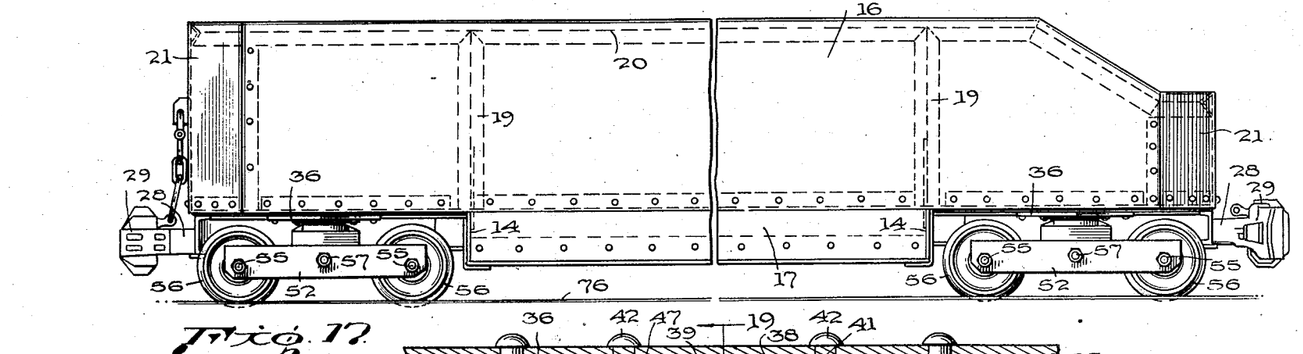
Fig. 17 is a view of the car shown in Fig. 16, in side elevation.
Figure 18:
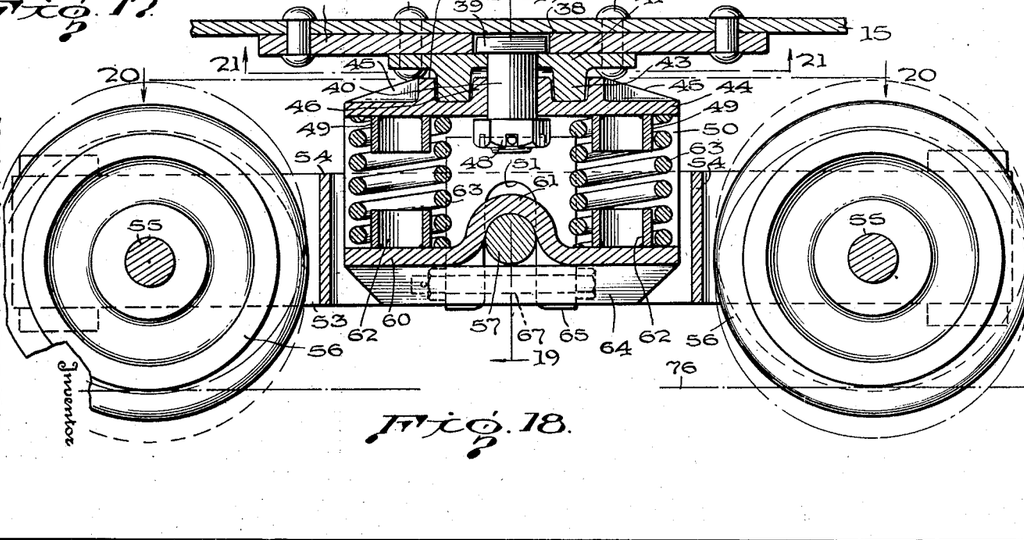
Fig. 18 is a vertical, sectional view, taken on the line 18—18 of Fig. 16.
Figure 19:
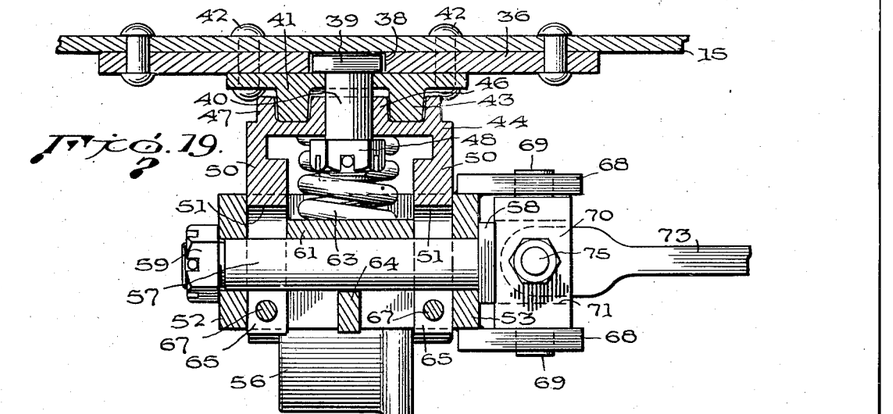
Fig. 19 is a vertical, sectional view, taken on the line 19—19 of Fig. 18.
Figure 20:
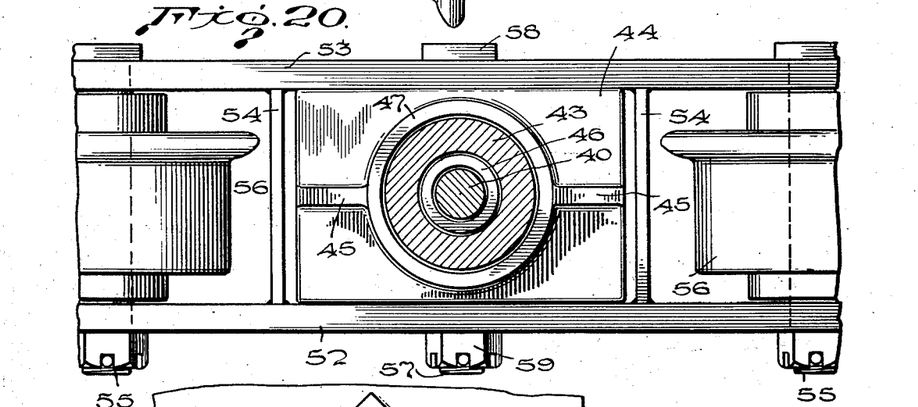
Fig. 20 is a horizontal, sectional view, taken on the line 20—20 of Fig. 18.
Figure 21:
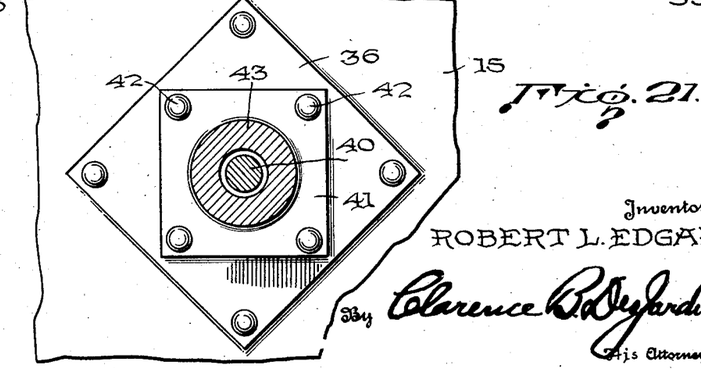
Fig. 21 is a horizontal, sectional view, taken on the line 21—21 of Fig. 18.
Figure 22:
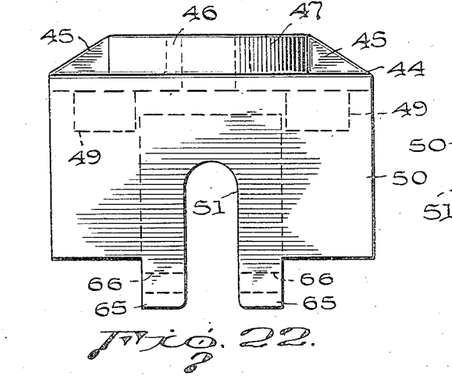
Fig. 22 is a view, in side elevation, of the lower center bearing member used in the modified form of my invention.
Figure 23:
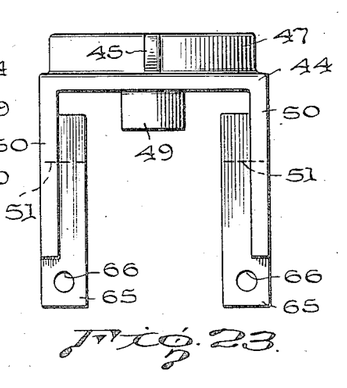
Fig. 23 is a view of said member, in end elevation.
Figure 24:
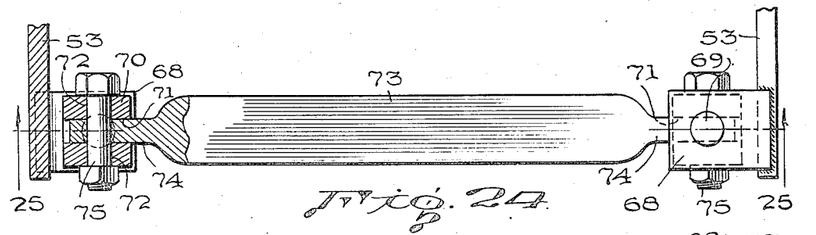
Fig. 24 is a top plan view of one of the tie bars and the universal connections between the truck frames and the ends thereof, employed in connection with the modified form of my invention.
Figures 25, 26:
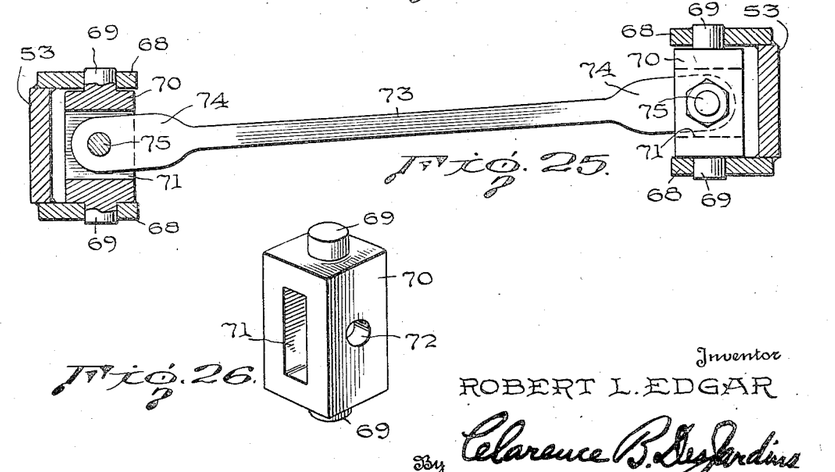
Fig. 25 is a section, taken on the line 25—25 of Fig. 24.
Fig. 26 is a perspective view of one of the swivel blocks, forming a part of the universal connections for the tie bar employed in the modified form of my invention.

As shown in Fig. 16, the swiveled truck frames, at the same end of the car, are interconnected by means of tie bars so as to maintain, in general, their parallelism, while permitting some slight tipping of the truck frames from the vertical, as may be required in rounding curves or by the inequalities of the tracks. At each end of the side member 53 of the truck frame, there are secured brackets 68, at the top and bottom. Each of these brackets has an opening therein and a swivel block 70, provided with trunnions 69 at the upper and lower ends thereof, is journaled between each pair of brackets, said trunnions projecting into the openings in the brackets. Each swivel block has a slot 71 formed therein, and holes 72 extending through the block at right angles to the slot. The swivel blocks at the same ends of the truck frames are connected by a tie bar 73, having the ends thereof flattened as at 74, and projecting into the slots 71 of the corresponding swivel blocks. These tie bars 73 are pivotally connected about horizontal axes with the swivel blocks by means of the bolts 75, which extend through the holes 72 and through holes in the flattened ends 74 of the tie bar. The blocks 70 swivel about vertical axes, and the tie bars are pivotally connected to the blocks about horizontal axes, so that the tie bars are universally connected at their ends to the truck frames at the same end of the car. Thus, while these tie bars maintain the truck frames in general parallelism, they permit some slight tipping of them from the vertical, as may be required in rounding curves or because of inequalities in the tracks.

I am aware that the constructions shown in this application may be varied considerably, without departing from the spirit of my invention and, therefore, I have claimed my invention broadly as indicated by the appended claims.

Having thus described my invention, what I claim as new and desire to secure by Letters Patent, is:

1. In a car construction, the combination of a car bottom, an upper center bearing member secured to the car bottom, a lower center bearing member engaging said upper member and revoluble thereon about a vertical axis, said lower member having a pair of depending side flanges, a truck frame slidably engaging said flanges, axles mounted fore and aft in said frame, wheels mounted on said axles, a truck hinge bolt carried by said truck frame centrally thereof and passing through said flanges, a spring saddle pivotally mounted on said truck hinge bolt between said flanges and with its edges in engagement therewith, and a pair of springs interposed between said lower member and said saddle.

2. In a car construction, the combination of a car bottom, an upper center bearing member secured to the car bottom, a lower center bearing member engaging said upper member and revoluble thereon about a vertical axis, said lower member having a pair of depending side flanges, a truck frame comprising rigidly connected side members slidably engaging said flanges, axles mounted in said frame fore and aft, wheels mounted on said axles between said side members, a truck hinge bolt carried by said truck frame centrally thereof and passing through said flanges, a spring saddle pivotally mounted on said truck hinge bolt between said flanges and with its edges in engagement therewith, and a pair of springs interposed between said lower member and said saddle.

3. In a car construction, the combination of a car bottom, an upper center bearing member secured thereto, a lower center bearing member revoluble with respect to said upper bearing member about a vertical axis, said lower member having a pair of depending side flanges each provided with a centrally located notch, a truck frame comprising a pair of rigidly connected side members slidably engaging said flanges, axles mounted in said frame fore and aft, car wheels mounted on said axles between the said side members, a truck hinge bolt carried by said truck frame centrally thereof and passing through said notches, a spring saddle pivotally mounted on said truck hinge bolt between said flanges and with its edges in engagement therewith, and a pair of springs interposed between said lower center bearing member and said spring saddle.

4. In a car construction, the combination of a car bottom, an upper center bearing member secured to the car bottom, a lower center bearing member engaging said upper member and revoluble thereon about a vertical axis, said lower member having a pair of depending side flanges each provided with a centrally located notch, a truck frame comprising a pair of rigidly connected side members slidably engaging said flanges, axles mounted in said frame fore and aft, wheels mounted on said axles between said side members, a truck hinge bolt carried by said truck frame centrally thereof and passing through said notches, a spring saddle having a central portion arched over said bolt and mounted between said flanges with its edges in engagement therewith, a retaining member secured to said saddle and passing beneath said bolt, and a pair of springs interposed between said lower bearing member and said saddle.

5. In a car construction, the combination of a car bottom, an upper center bearing member secured to the car bottom, a lower center bearing member engaging said upper member and revoluble thereon about a vertical axis, said lower member having a pair of spring guides projecting downwardly from the lower surface thereof and arranged fore and aft and a pair of depending side flanges each provided with a centrally located notch, a truck frame comprising a pair of rigidly connected side members slidably engaging said flanges, axles mounted in said frame fore and aft, wheels mounted on said axles between said side members, a truck hinge bolt carried by said truck frame centrally thereof and passing through said notches, a spring saddle having a central portion arched over said bolt and a pair of spring guides fore and aft projecting upwardly therefrom, said saddle being mounted between said flanges with its edges in engagement therewith, a retaining member secured to said saddle and passing beneath said bolt, and a pair of springs centered by said spring guides and interposed between said lower member and said saddle.

6. In a car construction, the combination of a car bottom, an upper center bearing member rigidly secured to said car bottom and having a downwardly extending annular bearing flange, a lower center bearing member engaging the lower surface of said annular bearing flange and having an annular flange extending upwardly therefrom and revolubly received within the annular bearing flange of the upper member, said lower member having a pair of depending side flanges, a truck frame slidably engaging said flanges, axles mounted fore and aft in said frame, wheels mounted on said axles, a truck hinge bolt carried by said truck frame centrally thereof and passing through said flanges, a spring saddle pivotally mounted on said truck hinge bolt between said flanges and with its edges in engagement therewith, and a pair of springs interposed between said lower member and said saddle.

7. In a car construction, the combination of a car bottom, an upper center bearing member rigidly secured to said car bottom and having a downwardly extending annular bearing flange, a lower center bearing member engaging the lower surface of said annular bearing flange and having an upwardly extending annular flange revolubly received within the annular bearing flange of the upper member, said lower bearing member and the annular flange thereof forming with the car bottom a chamber for the reception of lubricant, and said last-mentioned flange having lubricating passages therein for the passage of lubricant from said chamber to the bearing surfaces of upper and lower center bearing members, said lower member having a pair of depending side flanges, a truck frame slidably engaging said flanges, axles mounted fore and aft in said frame, wheels mounted on said axles, a truck hinge bolt carried by said truck frame centrally thereof and passing through said flanges, a spring saddle pivotally mounted on said truck hinge bolt between said flanges and with its edges in engagement therewith, and a pair of springs interposed between said lower member and said saddle.

8. In a car construction, the combination of a car bottom, an upper center bearing member rigidly secured to said car bottom and having a downwardly extending annular bearing flange, a lower center bearing member engaging the lower surface of said annular bearing flange and having an upwardly extending annular flange revolubly received within said first-mentioned flange, said lower center bearing member and the annular flange thereof forming a chamber for the reception of lubricant, and said last-mentioned flange being provided with lubricating openings therethrough, an upwardly extending annular flange secured to said lower center bearing member and surrounding the annular flange of the upper member, said lower member having a pair of depending side flanges, a truck frame slidably engaging said flanges, axles mounted fore and aft in said frame, wheels mounted on said axles, a truck hinge bolt carried by said truck frame centrally thereof and passing through said flanges, a spring saddle pivotally mounted on said truck hinge bolt between said flanges and with its edges in engagement therewith, and a pair of springs interposed between said lower member and said saddle.

9. In a car construction, the combination of a car bottom, an upper center bearing member rigidly secured thereto and having a downwardly extending annular bearing flange, a lower center bearing member engaging the lower surface of said flange and having an upwardly extending annular flange revolubly received within said first-mentioned flange, said lower member and the flange thereon constituting a chamber for the reception of lubricant, and said last-mentioned flange having lubricating openings therethrough, an upwardly extending annular flange rigidly secured to the lower center bearing member and surrounding the annular bearing flange of the upper member, a downwardly extending annular flange rigidly secured to said upper member and surrounding said last-mentioned flange, said lower member having a pair of depending side flanges, a truck frame slidably engaging said flanges, axles mounted fore and aft in said frame, wheels mounted on said axles, a truck hinge bolt carried by said truck frame centrally thereof and passing through said flanges, a spring saddle pivotally mounted on said truck hinge bolt between said flanges and with its edges in engagement therewith, and a pair of springs interposed between said lower member and said saddle.

10. In a car construction, the combination of a car bottom, an upper center bearing member secured to the car bottom, a lower center bearing member engaging said upper member and revoluble thereon about a vertical axis, said lower member having a pair of depending side flanges, a truck frame slidably engaging said flanges, axles mounted fore and aft in said frame, wheels mounted on said axles, a truck hinge bolt carried by said truck frame centrally thereof and passing through said flanges, a spring saddle pivotally mounted on said truck hinge bolt between said flanges and with its edges in engagement therewith, a pair of springs interposed between said lower member and said saddle, a bracket secured to said upper member, a bracket secured to said truck frame, and a bolt passing through said brackets for limiting vertical movement of said truck frame with respect to said upper center bearing member.

11. In a car construction, the combination of a car bottom, a king pin mounted thereon and depending vertically therefrom, a member revolubly mounted on said king pin but held from vertical movement relative to the car bottom, said member having a pair of depending side flanges, a truck frame slidably engaging said flanges, axles mounted fore and aft in said frame, wheels mounted on said axles, a truck hinge bolt carried by said truck frame centrally thereof and passing through said flanges, a spring saddle pivotally mounted on said truck hinge bolt between said flanges and with its edges in engagement therewith, and a pair of springs interposed between said member and said saddle.

12. In a car construction, the combination of a car bottom, a king pin mounted thereon and depending vertically therefrom, a member revolubly mounted on said king pin but held from vertical movement relative to the car bottom, said member having a pair of depending side flanges each provided with a centrally located notch, a truck frame comprising a pair of rigidly connected side members slidably engaging said flanges, axles mounted in said frame fore and aft, wheels mounted on said axles between said side members, a truck hinge bolt carried by said truck frame centrally thereof and passing through said notches, a spring saddle having a central portion arched over said bolt and mounted between said flanges with its edges in engagement therewith, a retaining member secured to said saddle and passing beneath said bolt, and a pair of springs interposed between said member and said saddle.

13. In a car construction, the combination of a car bottom, a king pin mounted thereon and depending vertically therefrom, a member revolubly mounted on said king pin but held from vertical movement relative to the car bottom, said member having a pair of spring guides projecting downwardly from the lower surface thereof and arranged fore and aft and a pair of depending side flanges each provided with a centrally located notch, a truck frame comprising a pair of rigidly connected side members slidably engaging said flanges, axles mounted in said frame fore and aft, wheels mounted on said axles between said side members, a truck hinge bolt carried by said truck frame centrally thereof and passing through said notches, a spring saddle having a central portion arched over said bolt and a pair of spring guides fore and aft projecting upwardly therefrom, said saddle being mounted between said flanges with its edges in engagement therewith, a retaining member secured to said saddle and passing beneath said bolt, a pair of springs centered by said spring guides interposed between said first-mentioned member and said saddle, and pins secured to said side flanges and spanning the lower ends of the notches therein.

14. In a car construction, the combination of a car bottom, an upper center bearing member secured thereto, a king pin extending through said member coaxially thereof and depending from the car bottom, a lower center bearing member mounted on said king pin and revoluble with respect to said upper bearing member, means for retaining said lower member against vertical movement with respect to the upper member, said lower member having a pair of spring guides projecting downwardly from the lower surface thereof and arranged fore and aft and a pair of depending side flanges each provided with a centrally located notch, a truck frame comprising a pair of rigidly connected side members slidably engaging said flanges, axles mounted in said frame fore and aft, car wheels mounted on said axles between the said side members, a truck hinge bolt carried by said truck frame centrally thereof and passing through said notches, a spring saddle having a central portion arched over said bolt and a pair of spring guides fore and aft projecting upwardly therefrom, said saddle being mounted between said flanges with its edges in engagement therewith, a retaining member secured to said saddle and passing beneath said bolt, a pair of springs centered by said spring guides and interposed between said lower center bearing member and said spring saddle, and pins secured to said side flanges and spanning the lower ends of the notches therein.

ROBERT L. EDGAR.